United States Patent
DiBelardino et al.

(10) Patent No.: US 9,302,412 B2
(45) Date of Patent: Apr. 5, 2016

(54) BATHING AND CLEANING BAR SOAP HOLDING POUF

(71) Applicants: Aldo Joseph DiBelardino, Virginia Beach, VA (US); Ke-chen Lin, Taipei (TW)

(72) Inventors: Aldo Joseph DiBelardino, Virginia Beach, VA (US); Ke-chen Lin, Taipei (TW)

(*) Notice: Subject to any disclaimer, the term of this patent is extended or adjusted under 35 U.S.C. 154(b) by 0 days.

(21) Appl. No.: 14/329,041

(22) Filed: Jul. 11, 2014

(65) Prior Publication Data
US 2015/0013091 A1 Jan. 15, 2015

Related U.S. Application Data

(60) Provisional application No. 61/845,815, filed on Jul. 12, 2013.

(51) Int. Cl.
| | | |
|---|---|---|
| *A47K 7/02* | (2006.01) | |
| *B29C 43/02* | (2006.01) | |
| *A47K 7/03* | (2006.01) | |
| *B29L 31/00* | (2006.01) | |

(52) U.S. Cl.
CPC ............ *B29C 43/021* (2013.01); *A47K 7/03* (2013.01); *B29L 2031/718* (2013.01); *Y10T 29/49826* (2015.01); *Y10T 156/1036* (2015.01)

(58) Field of Classification Search
CPC .......... A47L 13/17; A47L 13/19; A47K 7/03; A47K 7/02
USPC ....................................................... 15/209.1
See application file for complete search history.

(56) References Cited

U.S. PATENT DOCUMENTS

| | | | |
|---|---|---|---|
| 346,773 A | 8/1886 | Rees | |
| 1,351,311 A | 8/1920 | Vimeburg | |
| 1,748,406 A | 4/1929 | Blair | |
| 3,167,805 A | 2/1965 | Zuppinger et al. | |
| 3,251,571 A | 5/1966 | Ernest | |
| 3,430,754 A | 3/1969 | Meseke et al. | |
| 3,488,126 A * | 1/1970 | Avallone ........................ 401/8 |
| 3,519,568 A | 7/1970 | Needleman | |
| 4,190,550 A | 2/1980 | Campbell | |

(Continued)

FOREIGN PATENT DOCUMENTS

| | | |
|---|---|---|
| CN | 101026985 A | 8/2007 |
| CN | 201299501 Y | 9/2009 |

(Continued)

OTHER PUBLICATIONS

Gregorius, "Soap Lather and Cleaning"; Newton, Ask a Scientist!, Jun. 2012 http://www.newton.dep.anl.gov/askasci/gen06/gen06999.htm.

(Continued)

*Primary Examiner* — Jennifer C Chiang

(57) ABSTRACT

An improved pouf or soap-holding lathering and scrubbing device which can conveniently hold a bar of soap and create copious aerated lather when wetted and massaged or manipulated comprises a sheet of mesh material which is formed or folded into a compact mass or arrangement. The sheet is formed or supplied in an endless loop or ring which is then compressed in a direction parallel to the sheet to form a ring of compressed or folded mesh material that has a recess. The compressed ring is then secured in its compressed state by two or more ties. A cord can be threaded through the compressed ring and cinched by an O-ring or other device to enable the cord to hold a bar of soap in the recess.

12 Claims, 6 Drawing Sheets

(56) References Cited

U.S. PATENT DOCUMENTS

| | | | |
|---|---|---|---|
| 4,199,835 A | 4/1980 | Heyer et al. | |
| 4,228,834 A | 10/1980 | Desnick | |
| 4,969,225 A | 11/1990 | Schubert | |
| 5,022,517 A | 6/1991 | Benitez | |
| 5,144,744 A | 9/1992 | Campagnoli | |
| 5,301,696 A | 4/1994 | Revson | |
| 5,462,378 A | 10/1995 | Webb | |
| 5,465,452 A | 11/1995 | Girardot et al. | |
| 5,687,447 A | 11/1997 | Bynum et al. | |
| 5,709,434 A | 1/1998 | Chen | |
| 5,715,561 A | 2/1998 | Tuthill et al. | |
| 5,727,277 A | 3/1998 | Chien | |
| 5,740,599 A | 4/1998 | Chang | |
| 5,758,386 A | 6/1998 | Chen | |
| 5,766,700 A | 6/1998 | Borcherds | |
| 5,784,747 A * | 7/1998 | Girardot et al. | 15/229.11 |
| 5,857,794 A | 1/1999 | Chien | |
| 5,937,472 A | 8/1999 | Girardot et al. | |
| 6,015,242 A * | 1/2000 | Gillis | 401/201 |
| 6,042,288 A | 3/2000 | Rattinger et al. | |
| 6,048,407 A * | 4/2000 | Schoch | 134/6 |
| 6,066,607 A | 5/2000 | Gordon et al. | |
| 6,092,257 A | 7/2000 | Chen | |
| 6,105,196 A | 8/2000 | Chang | |
| 6,122,859 A | 9/2000 | Lazar | |
| 6,264,391 B1 * | 7/2001 | Kroha | 401/201 |
| 6,443,527 B1 * | 9/2002 | Borcherds | A47K 7/02 15/209.1 |
| 6,676,222 B2 | 1/2004 | Hsu | |
| 6,783,294 B2 | 8/2004 | Duden et al. | |
| 6,799,917 B1 * | 10/2004 | Sampson | 401/88 |
| 6,839,932 B2 | 1/2005 | Huang | |
| 6,871,375 B2 * | 3/2005 | Borcherds | 15/209.1 |
| 6,883,994 B1 | 4/2005 | Grogg | |
| 6,887,007 B2 * | 5/2005 | Sorrell | 401/205 |
| 6,902,338 B2 | 6/2005 | Puvvada et al. | |
| 7,566,491 B2 | 7/2009 | Dilnik et al. | |
| D623,356 S | 9/2010 | Lee et al. | |
| 7,854,977 B2 * | 12/2010 | Kajiwara | 428/36.1 |
| 8,137,018 B2 | 3/2012 | Galvan-Nanez | |
| 8,282,301 B2 | 10/2012 | Larsen et al. | |
| 8,814,457 B1 * | 8/2014 | Austin et al. | 401/201 |
| 2005/0186234 A1 | 8/2005 | Kelly | |
| 2006/0079416 A1* | 4/2006 | Myers | 510/130 |
| 2009/0188060 A1 | 7/2009 | Ferguson | |
| 2013/0098381 A1* | 4/2013 | McBrayer | 132/200 |
| 2013/0125324 A1 | 5/2013 | Celia, Sr. et al. | |

FOREIGN PATENT DOCUMENTS

| | | |
|---|---|---|
| CN | 202136244 U | 2/2012 |
| CN | 202235064 U | 5/2012 |
| CN | 202408683 U | 9/2012 |
| JP | H10137152 A | 5/1998 |

OTHER PUBLICATIONS

Chameides, "Chemical Marketplace: Bar Soap vs. Liquid Soap"; HuffingtonPost.com, Nov. 2012 . http://www.huffingtonpost.com/bill-chameides/chemical-marketplace-bar_b_2104678.html.

Osborne, "Does your body wash contain harmful chemicals?"; PureHealthGuide.com, Feb. 2012 http://purehealthguide.com/2012/02/does-your-body-wash-contain-harmful-chemicals/.

Thedailygreen.com, "Body Wash vs. Bar Soap"; TheDailyGreen.com, 2010 http://www.biglather.com/body-wash-vs-bar-soap/.

Siddons, "How often should i replace my bath sponge?"; Health.howStuffWorks.com, Sep. 2009 http://health.howstuffworks.com/skin-care/cleansing/basics/how-often-replace-bath-sponge2.htm/printable.

* cited by examiner

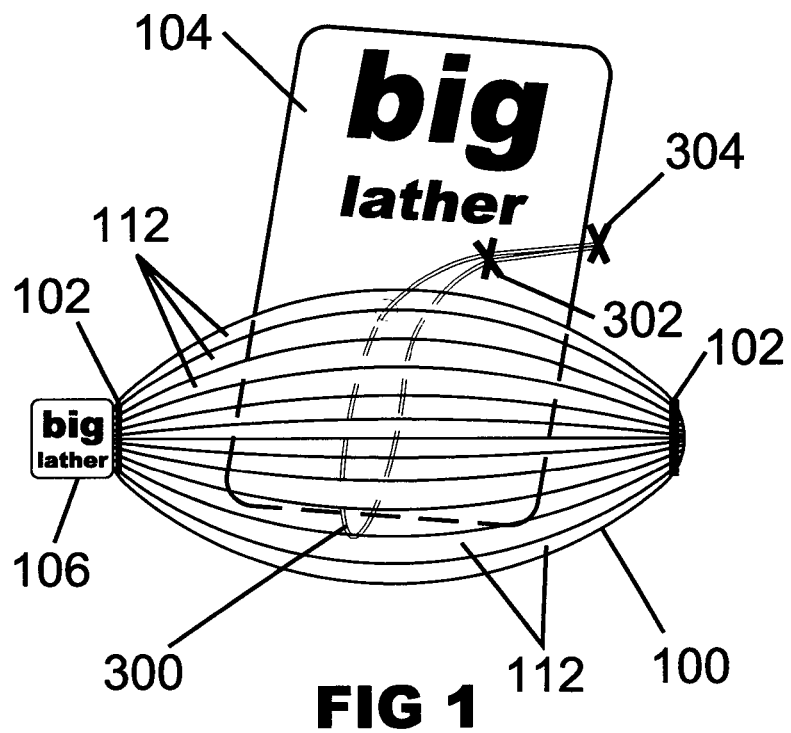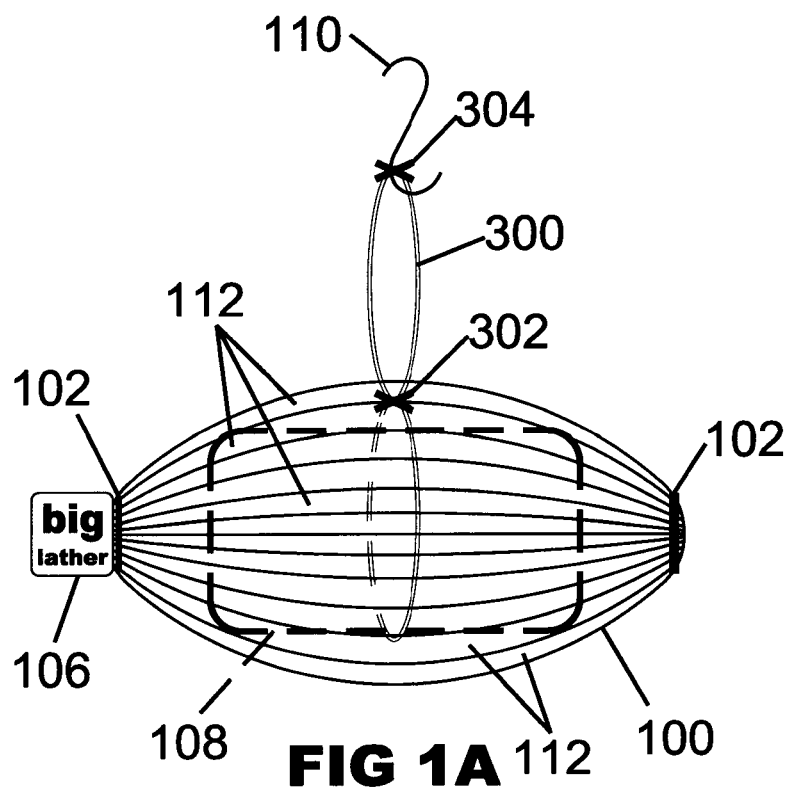

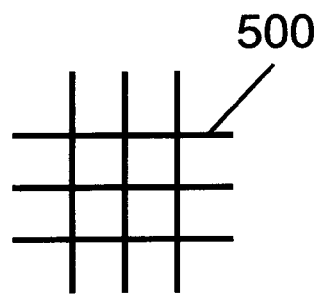
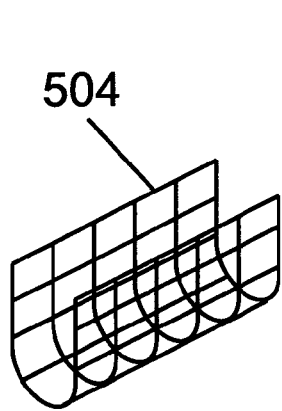
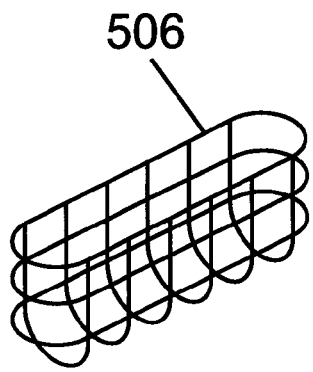
FIG 5
FIG 5A
FIG 5B
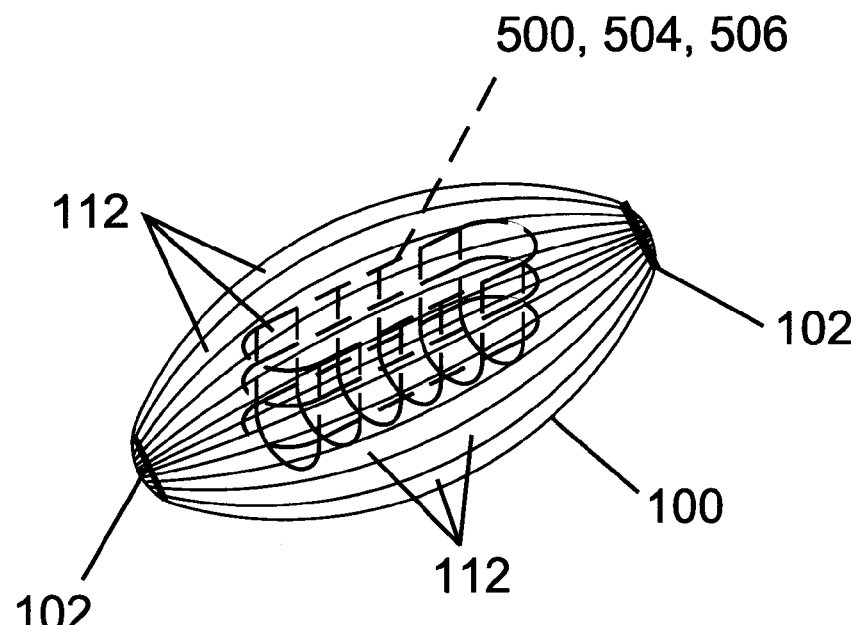
FIG 5C

BATHING AND CLEANING BAR SOAP HOLDING POUF

CROSS-REFERENCE TO RELATED APPLICATION

This application claims the benefit of provisional patent application Ser. No. 61/845,815, filed 2013 Jul. 12 by the present inventors.

BACKGROUND

Prior Art

Many forms of soap and hardware have been developed for enhancing the bathing experience. In particular soaps and hardware have been developed to produce thicker and more copious soap lather because a thick, copious lather makes washing and bathing more satisfying and effective (Gregorius).

Bars and liquid are the dominant soap forms in the bathing marketplace. Bar soap generally needs less user activity to use and is usually most cost and environmentally friendly. However bar soap can be hard to hold and generally does not produce as much lather as liquid soap.

Body wash, a form of liquid soap intended for bathing, is generally more profitable and expensive and is heavily marketed for many claimed benefits, including rich lather. But body wash needs more user activity to deploy and is more costly and environmentally damaging.

Nevertheless, because of its better lather, body wash sales are eclipsing bar soap. This trend enriches large entities at the expense of consumers and the environment (Chameides). As we evolve from a disposable society to a sustainable world, consumers need better choices to be green while getting clean. Thus we believe that producing more aerated lather from bar soap is better for the environment and consumers.

The following is a tabulation of some prior art that presently appears relevant to the above considerations:

U.S. Patents

| Pat. No. | Kind Code | Issue Date | Patentee |
| --- | --- | --- | --- |
| 346,773 | A | 1886 Aug. 3 | Rees |
| 1,351,311 | A | 1920 Aug. 31 | Virneburg |
| 1,748,406 | A | 1929 Apr. 26 | Blair |
| 3,167,805 | A | 1962 Dec. 21 | Zuppinger et al. |
| 3,251,571 | A | 1963 May 20 | Ernest |
| 3,430,754 | A | 1968 Feb. 7 | Meseke et al. |
| 3,519,568 | A | 1967 Apr. 3 | Needleman |
| 4,190,550 | A | 1980 Feb. 26 | Campbell |
| 4,199,835 | A | 1980 Apr. 29 | Heyer et al. |
| 4,228,834 | A | 1980 Oct. 21 | Desnick |
| 4,969,225 | A | 1990 Nov. 13 | Schubert |
| 5,022,517 | A | 1991 Jun. 11 | Benitez |
| 5,144,744 | A | 1992 Sep. 8 | Campagnoli |
| 5,301,696 | A | 1994 Apr. 12 | Revson |
| 5,462,378 | A | 1995 Oct. 31 | Webb |
| 5,465,452 | A | 1995 Nov. 14 | Girardot et al. |
| 5,687,447 | A | 1997 Nov. 18 | Bynum et al. |
| 5,709,434 | A | 1998 Jan. 20 | Chen |
| 5,715,561 | A | 1998 Feb. 10 | Tuthill et al. |
| 5,727,277 | A | 1998 Mar. 17 | Chien |
| 5,740,599 | A | 1998 Apr. 21 | Chang |
| 5,758,386 | A | 1998 Jun. 2 | Chen |
| 5,766,700 | A | 1998 Jun. 16 | Borcherds |
| 5,857,794 | A | 1999 Jan. 12 | Chien |
| 5,937,472 | A | 1999 Aug. 17 | Girardot et al. |
| 6,015,242 | A | 2000 Jan. 18 | Gillis |
| 6,042,288 | A | 2000 Mar. 28 | Rattinger et al. |
| 6,092,257 | A | 2000 Jul. 25 | Chen |
| 6,066,607 | A | 2000 May 23 | Gordon et al. |
| 6,105,196 | A | 2000 Aug. 22 | Chang |
| 6,122,859 | A | 2000 Sep. 26 | Lazar |
| 6,443,527 | B1 | 2002 Sep. 3 | Borcherds et al. |
| 6,676,222 | B2 | 2004 Jan. 13 | Hsu |
| 6,783,294 | B2 | 2004 Aug. 31 | Duden et al. |
| 6,839,932 | B2 | 2005 Jan. 11 | Huang |
| 6,871,375 | B2 | 2005 Mar. 29 | Borcherds |
| 6,883,994 | B1 | 2005 Apr. 26 | Grogg |
| 6,887,007 | B2 | 2005 May 3 | Sorrell |
| 6,902,338 | B2 | 2005 Jun. 7 | Puvvada et al. |
| 7,566,491 | B2 | 2009 Jul. 28 | Dilnik et al. |
| 8,137,018 | B2 | 2012 Mar. 20 | Galvan-Nanez |
| 8,282,301 | B2 | 2012 Oct. 9 | Larsen et al. |
| D623356 | S | 2010 Sep. 7 | Lee et al. |

U.S. Patent Application Publications

| Publication Nr. | Kind Code | Publ. Date | Applicant |
| --- | --- | --- | --- |
| 20050186234 | A1 | 2005 Aug. 25 | Kelly |
| 20060079416 | A1 | 2006 Apr. 13 | Myers |
| 20090188060 | A1 | 2009 Jul. 30 | Ferguson |
| 20130125324 | A1 | 2013 May 23 | Celia, Sr. et al. |

Foreign Patent Documents

| Foreign Doc. Nr. | Cntry Code | Kind Code | Pub. Dt | App or Patentee |
| --- | --- | --- | --- | --- |
| JPH10137152 | JP | A | 1998 May 26 | Nozaki et al. |
| CN101026985 | CN | A | 2007 Aug. 29 | Myers |
| CN201299501 | CN | Y | 2009 Sep. 2 | You |
| CN202136244 | CN | U | 2012 Feb. 8 | He |
| CN202235064 | CN | U | 2012 May 30 | Di |
| CN202408683 | CN | U | 2012 Sep. 5 | Guo |

Non-Patent Literature Documents

Gregorius, Roberto, Newton, Ask A Scientist!, "Soap Lather and Cleaning" http://www.newton.dep.anl.gov/askasci/gen06/gen06999.htm (June 2012)

Chameides, Bill, HuffingtonPost.com, "Chemical Marketplace: Bar Soap vs. Liquid Soap" (November 2012)

Osborne, Carrie, PureHealthGuide.com, "Does your body wash contain harmful chemicals? (February 2012)

TheDailyGreen.com, "Body Wash vs. Bar Soap" (http://www.biglather.com/body-wash-vs-bar-soap/) (2010)

Siddons, Sarah, Health.HowStuffWorks.com, "How often should I replace my bath sponge?" (September 2009)

In the above references, Rees sought to improve bathing by putting soap into a sack or bag with a handle. Clearly much room for improvement exists as indicated by the continued activity and crowded art.

Many forms of bathing hardware have been presented to provide various benefits. Virneburg forms a washrag to hold soap more easily. Blair shows a rubber sponge material with a center pocket or cavity to hold a cake of soap. Zuppinger et. al. shows a net enclosed soap article.

Campbell presents a seamless fibrous soap-filled pad. Desnick shows a plastic mesh bag having hook-and-loop fasteners for closing. Schubert offers a non-woven, synthetic fibre scrub brush capable of holding soap. Benitez describes a wrap for bar soap made from layers of nylon netting. Webb introduces a soapsock. Girardot et. al. ('452) describes a personal cleaning implement made from extruded scrim having a diamond-mesh pattern. Toshio et. al. presents an expansible net bag to make shrinking bar soap easier to hold. Chien ('794) discloses a bathing soap pouch made by folding and tying hollow cylindrical mesh with a cord adjuster. These items are usually marketed as mesh bag soap savers and can be purchased at Bed Bath & Beyond. Duden et. al. discloses a textured film solid cleanser holder that can be purchased at Target. Puvvada et. al. describes various toilet bars contained within a porous pouch. Di discloses an anti-slip sleeve for soap. Guo discloses a nylon mesh soap sleeve. All of these constructions produce limited lather, are difficult to hold, are coarse against the skin, and can promote mold growth.

Ernest and Needleman offer a different option by using cord or rope to introduce adjustable loop holders and once popular rope soap. These require custom soap forms and do not enhance lather production or feel against skin.

The development of different materials influences bathing hardware design. Heyer et. al. discloses a bath ball fastened at the center. Bath balls made from various materials are popular and can be purchased at KMart, and other retailers. Tuthill et. al. shows a soft stretched tubular scrim that can exfoliate. Bath balls or mesh poufs are rounded devices that can be constructed many ways. Dilnik et. al discloses disposable and reusable pouf products. The current best selling bath poufs are made by bunching mesh sleeve material and tying the center. Campagnoli, Chen ('434), Girardot et al. (U.S. Pat. No. 5,937,472), Borcherds et al. show examples of this construction and can be purchased at Wal-Mart. The mass of bunched mesh in the center of the pouf forms a honeycomb structure which retains water between uses that can feed mold growth. Rubbing a mesh pouf during normal use over time can cause the pouf to come apart and look bad. For these reasons this construction is disposable, with replacement advised approximately every 8 weeks (Siddons).

Lee et. al. shows a dual sided shower tool design for a cleansing article. Gordon et al. discloses a body wash or liquid soap intended for bathing, combined with a mesh pouf; this is a current popular bathing system. However, as stated, compared to bar soap, liquid soap is economically and environmentally expensive and is packaged in plastic bottles that usually end up in landfills.

Hardware for tying, holding, and closing, also known as cord adjusters, are shown in Meseke et al. as a closure device in the form of a loop. Revson describes a holder that includes a band. Borcherds ('700) presents a loop fastening device. Lazar describes an elastic loop tie. Girardot et. al. ('472) discloses an elastic O-ring binding member. Borcherds et al. presents a loop securing device. These devices can be felt when rubbed against skin and do not offer a good user experience.

Bynum et al. and Chien ('277) offer one alternative construction achieved by rolling or bunching and tying material in two or more places. Elastic mesh tube introduced with this construction is shown by Chang ('599 and '196), Chen ('386 and '257), Hsu, Huang, and Borcherds ('375). These constructions, known as bath balls or pumpkin poufs, do not provide a good user experience and are not as popular as center bunched poufs and thus considered novelty items.

Combining soap with bathing devices starts to address soap expense and use problems. Borcherds ('375) suggests formation of a central pocket to secure soap. Gillis discloses a soap holding scrub puff. Rattinger et. al. describes a cleaning system comprising a synthetic detergent and a pouf or sponge for holding the bar. Grogg presents a cleaning device with soap bead holder. Sorrell disclose a handheld washing device that contains soap within the interior. Myers, in US and China patents, offers a mesh pouf with a tulle pouch for soap. Ferguson suggests a puff having a source of soap embedded therein. You and He disclose cleaning devices with soap. Galvan-Nanez and Larsen et. al disclose pre-soaped or integrated soap devices. Kelly discloses soap encapsulated net material. Celia, Sr. et. al presents a mesh ball impregnated with soap. These constructions are limited by the amount of soap lather that can be generated and can be considered disposable.

Chameides confirms liquid soap is a bad environmental bet and is also a bad bet for your family budget. Liquid soap can also contain harmful chemicals (Osborne), and is packaged in plastic bottles that usually end up in landfills. The main ingredient in most liquid body washes is water, creating more pollution and waste water (TheDailyGreen.com).

However bar soap usually does not make as much lather as body wash or liquid soap. Bar soap can become slimy and slippery when it does not dry between uses. Slimy bar soap dissolves faster, thus increasing cost of use. Shrinking slippery bar soap becomes hard to hold and is usually not completely consumed. Bar soap bags do not generate copious lather and can feel coarse or rough against skin.

Loofahs and plastic mesh bath poufs can become infected with bacteria and mold (Siddons). Poufs only make lather while soap and water are present and usually need soap added several times while bathing. Popular poufs grow mold and come apart, making them short-lived and therefor costly.

SUMMARY

In accordance with one embodiment an improved pouf can conveniently hold a bar of soap and is easy to use, long lasting, and is able to generate copious amounts of aerated lather. Every six weeks or so when the soap bar is completely consumed the pouf can be washed in a dishwasher. Then a new soap bar is inserted to continue making more aerated lather. The pouf comprises a flexible tube or hose that is run through a piercing machine to make a cylinder or tube whose walls have a mesh pattern. This cylinder or tube is compressed axially to form a ring or donut. The ring is secured at two or more points by tying a cord or line around the ring at these points, thereby forming a pouf with a recess for holding a bar of soap. Sheet mesh material can also be used if it is first formed into a flexible cylinder, sleeve or tube.

Advantages

Accordingly several advantages of one or more aspects of the present pouf are as follows:

(a) It helps the environment and family budgets by enabling bar soap to compete with liquid soap.

(b) It produces large amounts of aerated lather from bar soap and makes aerated lather continuously while bathing or cleaning.

(c) It makes holding bar soap easier and using bar soap more efficient.

(d) It reduces pollution, empty plastic bottle waste, and the presence of harmful chemicals by promoting bar soap use over liquid soap.

(e) It inhibits mold growth on the pouf when hung to dry between uses.

(f) It offers copious aerated lather and a soft pouf feel that is missing from current bar soap bags.

(g) It offers a sustainable pouf that can last more than 12 months.

These and other advantages of one or more aspects will become apparent from a consideration of the ensuing description and accompanying drawings and trying the actual www-.BigLather.com product.

DRAWINGS

Figures

In the drawings, closely related figures have the same number but different alphabetic suffixes.

FIG. 1 shows a bath pouf according to one embodiment with packaging card inserted into recess.

FIG. 1a shows the pouf hanging, with bar soap inserted into recess.

FIG. 5 shows net material with large openings.

FIG. 5a shows net material formed into wrap.

FIG. 5b shows net material formed into bag.

FIG. 5c shows net material, wrap, or bag inserted into mesh material recess.

Figure 2:
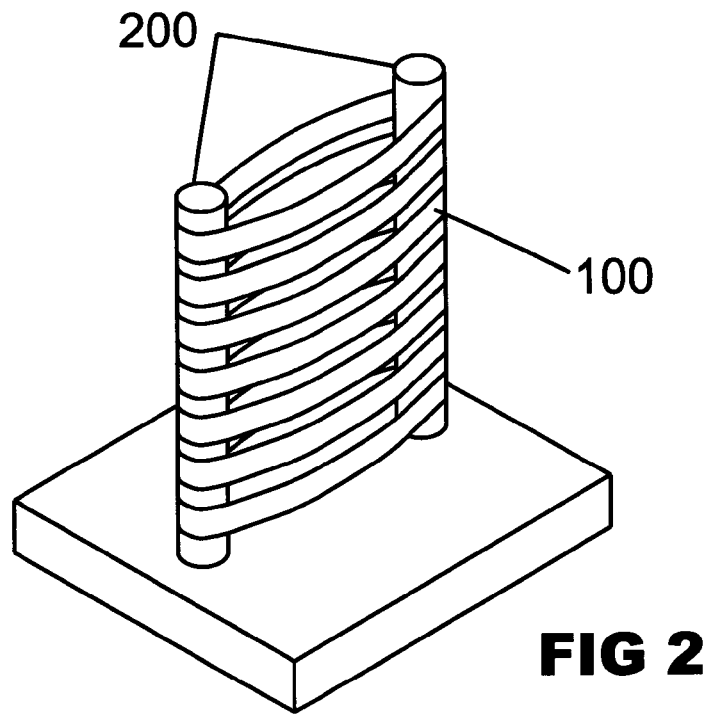
FIG. 2 shows a sleeve of mesh material positioned over opposing members to start assembly of the pouf.
Figure 2A:
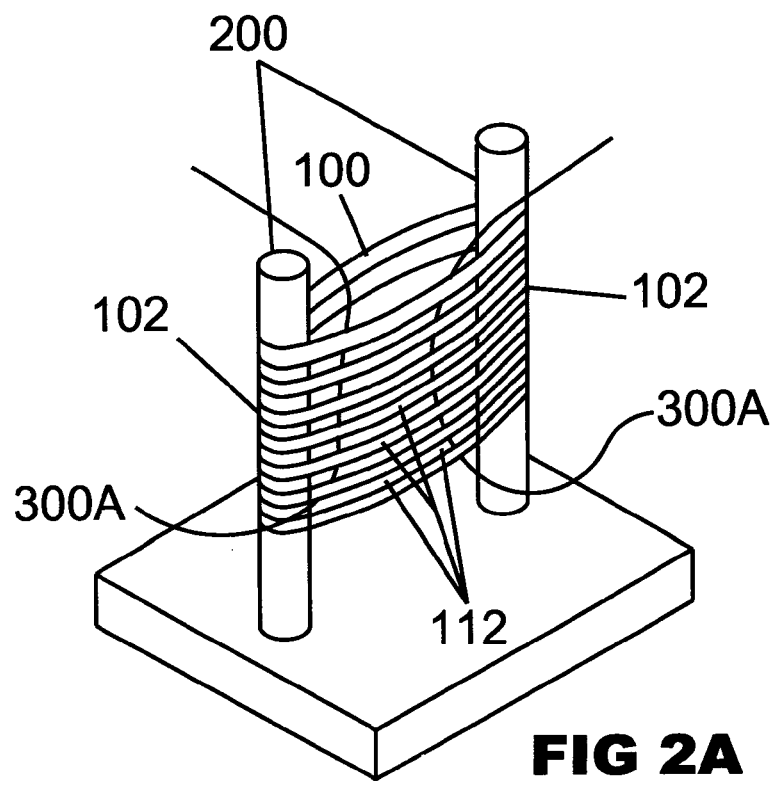
FIG. 2a shows the mesh sleeve secured or tied in two opposed positions.

| DRAWINGS - REFERENCE NUMERALS | | | |
|---|---|---|---|
| 100 | mesh sleeve material | 102 | securing position |
| 104 | packaging card | 106 | tag |
| 108 | soap bar | 110 | hook |
| 112 | recess | | |
| 200 | opposing members | | |
| 300 | cord | 300A | line |
| 302 | O-ring | 304 | tie |
| 306 | needle | | |
| 500 | net | 502 | openings |
| 600 | handle | 602 | straps |
| 604 | decorative device | | |

DETAILED DESCRIPTION

FIG. 1 TO FIG. 3

First Embodiment

One embodiment is illustrated in FIG. 1, a perspective view of a bath pouf having a recess as is shown at 112 with a packaging and instruction card 104 inserted into the recess 112. As FIGS. 1, 1A and 2A-2C each show, there are a plurality of solid curved lines drawn between the ends 102 to show the plurality of bunched sheets of mesh material, that can be in the form of sleeves or tubular scrims, for example, and a recess 112 is formed between each adjacent sleeve that is represented by the adjacent lines that are drawn between the ends 102. Each recess 112 that is provided around the circumference of the pouf is formed by bunching the mesh material 100. By so doing many recesses 112 are formed, as shown, about the pouf and a tag or card 104 or a bar of soap 108 can be inserted and held within one of the plurality of recesses. The entry point into each such recess 112 is defined between the solid lines showing bunched mesh and recesses about the sides of the finished pouf. A cylindrical sheet (not shown) of plastic mesh sleeve material 110 is compressed to a donut or ring and is then bunched and tied or secured at ends 102 at two or more opposing positions. The details of the manner in which the mesh material is bunched are discussed infra. A tag 106 is attached at the left end 102. Cord 300 is threaded into mesh sleeve material 100, then through packaging card 104, then twice through an O-ring 302 of rubber or other elastic material, and tied with a knot 304 to complete the assembly.

FIG. 1a is a perspective view of the bath pouf hanging from a hook 110 with a rectangular soap bar 108 inserted into recess 112. This pouf, when wet and massaged, will generate copious amounts of lather by aerating the lather and provides a user with a soft feeling experience.

Operation

FIGS. 1 & 1A

To use the pouf, the user first removes packaging card 104 (FIG. 1) by tearing or cutting it and removing it from the pouf recess 112. Soap bar 108 is inserted into the recess 112 in the center of the pouf. O-ring 302 is slid along cord 300 toward soap bar 108 to secure the bar inside the pouf. The O-ring 302, cord 300, and mesh 100 provide a soap bar 108 securing means.

Then the user, while in a shower or tub, wets and rubs or massages the pouf to make it lather. Additional lather is made when the user rubs the pouf against the body to bathe or clean. The massaging or rubbing of the random bunched mesh material 100 that surrounds and agitates the soap bar 108 while allowing free flow of applied water enables the pouf to aerate the lather to make more or copious lather while providing a soft feel for the user.

After finishing their ablutions, the user rinses the pouf and hangs it to dry between uses to inhibit mold growth, as shown in FIG. 1a. The unique construction of the pouf that enables water to fully drain between uses when hung properly and maintaining the soap bar 108 in the recess 112 within the pouf and near any remaining organic matter, helps to inhibit mold growth.

After the first use when the soap bar 108 has dried, it begins to embed into the mesh 100. The embedding of the soap bar 108 into the mesh 100 further secures the soap bar 108 in the pouf and enhances the copious lather generation. More aerated lather is generated and generated quicker from this continuous embedding process.

When soap bar 108 is completely used, the pouf can be washed in a dishwasher if desired. Then O-ring 302 is slid along cord 300 toward tie 304 to allow a new soap bar 108 to be inserted into recess 112. Then O-ring 302 is slid along cord 300 toward the new soap bar 108 to secure it and continue use. The pouf construction maintains the stability of the mesh material 100 to allow for prolonged bathing use. Thus making the pouf reusable and sustainable.

Fabrication

Figure 2B:
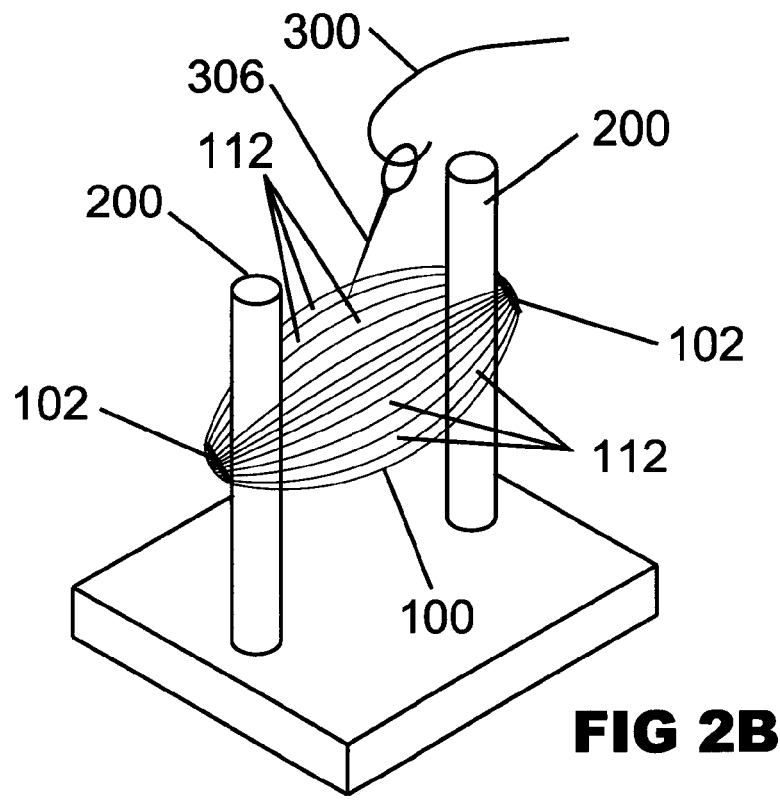
FIG. 2b shows a cord threaded through the bunched mesh sleeve material.
Figure 2C:
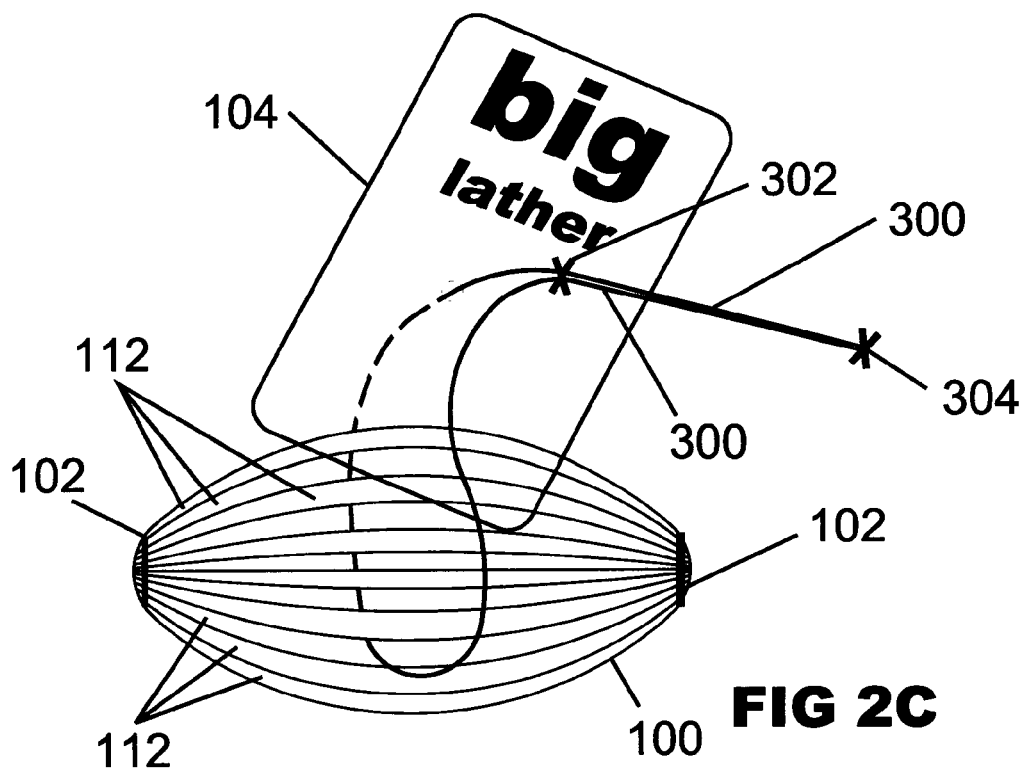
FIG. 2c shows the insertion of a packaging card into recess, threading of an O-ring, and tying of the cord.

FIGS. 2 to 2C

The method of fabricating or assembling the pouf will indicate its detailed construction. A first assembly method begins in FIG. 2 where a cylindrical or sleeve sheet of mesh sleeve material 100 about 12.5 cm wide by 190 cm long is looped over two opposing vertical upright members 200. Members 200 are about 30 cm tall and are spaced about 15 cm apart. This common material is also known as elastic mesh, hollow cylindrical mesh, extruded scrim, tube net, tubular scrim, netting tubes, diamond-mesh, extruded polymeric netting tube, open cell mesh tube, and flexible mesh. This material can be obtained from www.conwedplastics.com.

Then (FIG. 2B) the user compresses the sleeve of mesh material 100 on uprights 200 to have a shorter vertical height by tying and cinching two lines 300A around opposite sides of mesh 100. These two lines 300A are tied at opposed locations to form two holding loops or cinches 102. The compressed loop now is shaped like an elongated donut and has an internal hole or cavity or center recess 112.

As shown in FIG. 2b a needle 306 can be used to thread a cord 300 through the mesh sleeve 100 to form a bar soap securing apparatus around the sleeve recess 112. I discuss below the manner in which cord 300 is threaded through and tied. Sleeve 100 with cinches 102 and untied soap bar securing apparatus line 300 is then removed from upright members 200.

Then (FIG. 2c) a packaging card 104 is inserted into recess 112. The user then threads cord 300 through card 104 and an O-ring 302 twice, as described infra. Finally the user ties the cord 300 into a knot 304 to form part of the bar soap securing apparatus as shown in FIG. 3A (The pouf per se is omitted in FIG. 3A for clarity.).

FIG. 3

O-Ring And Cord

Figure 3:
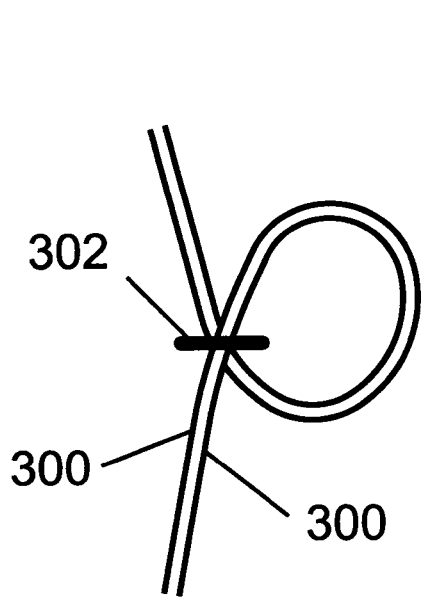
FIG. 3 shows the cord threaded through O-ring twice, pulled, and tied.
Figure 3A:
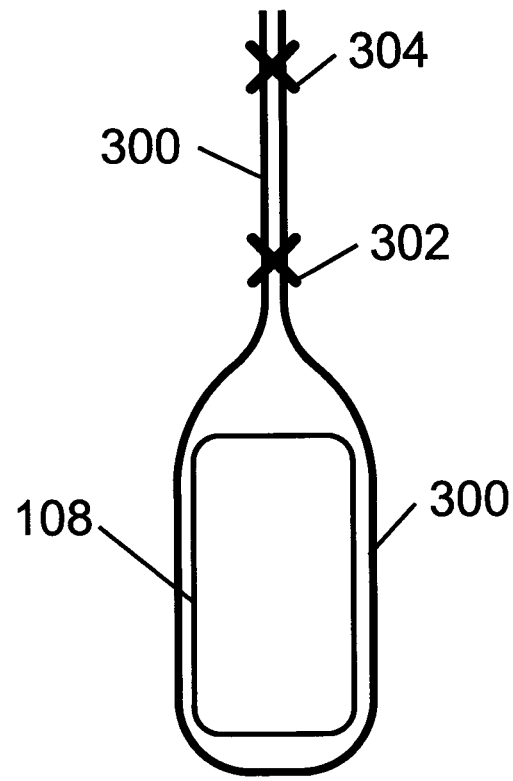
FIG. 3a shows part of a bar soap securing apparatus made from FIG. 3.

FIG. 3 shows how two cords 300 are threaded twice through O-ring 302. (The pouf is not shown in FIG. 3 for clarity.) The cord 300 is passed through the center of the pouf with needle 306. Then the cord 300 is passed through the O-ring 302 and is looped around and passed through the O-ring 302 again as shown. The cords 300 are then grasped at opposite sides of the O-ring 302 and pulled. This causes the O-ring 302 to twist and grasp the cords 300 tightly and serve as a cord adjuster so that the O-ring 302 can hold itself in any desired position along the cords. The loop formed from cord 300 is shown in FIG. 3A around soap bar 108 (pouf omitted). After this loop is cinched around bar 108 the O-ring 302 is slid down against the bar 108 to hold the loop in the cinched position to secure the soap bar 108.

FIGS. 4-6

Additional Alternative Embodiments

Figure 4:
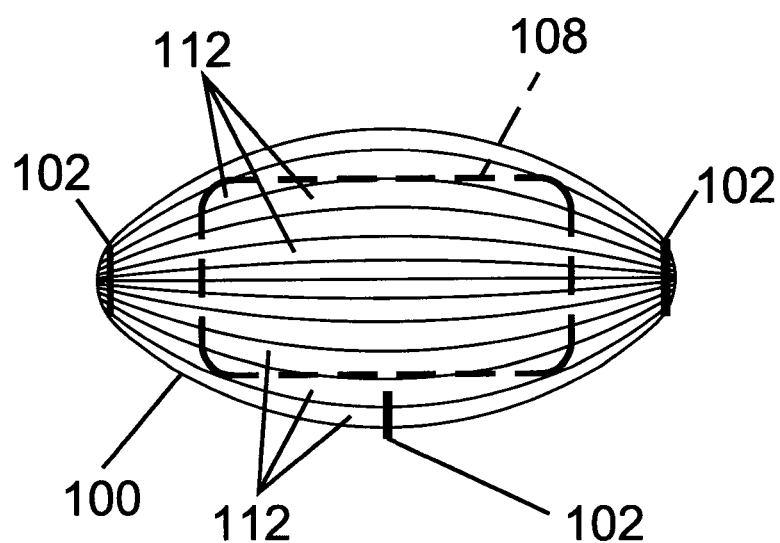
FIG. 4 shows a mesh sleeve secured at two or more positions with a soap bar within recess according to a second embodiment.

FIG. 4 shows an alternative embodiment. Here mesh sleeve material 100 secured at three points 102, two at opposite ends as before and one in the middle at one side of the ring. Soap bar 108 is inserted within the recess 112.

FIG. 5 shows a sheet of net material 500 with openings 502. The ratio of the size of each opening 502 to the thickness of the strands or fibers of net material 500 is greater than 5 to 1; this allows development of a copious lather while securing soap bar 108 (not shown). Net or mesh 500 is formed into a wrap 504 (FIG. 5A) or bag 506 (FIG. 5B) with one or more open sides. FIG. 5C shows the bag 506 positioned within the pouf recess 112. The pouf's mesh sleeve material 100 is compressed or bunched and secured at two or more positions 102 to fully secure the soap bar 108 (not shown).

Figure 6:
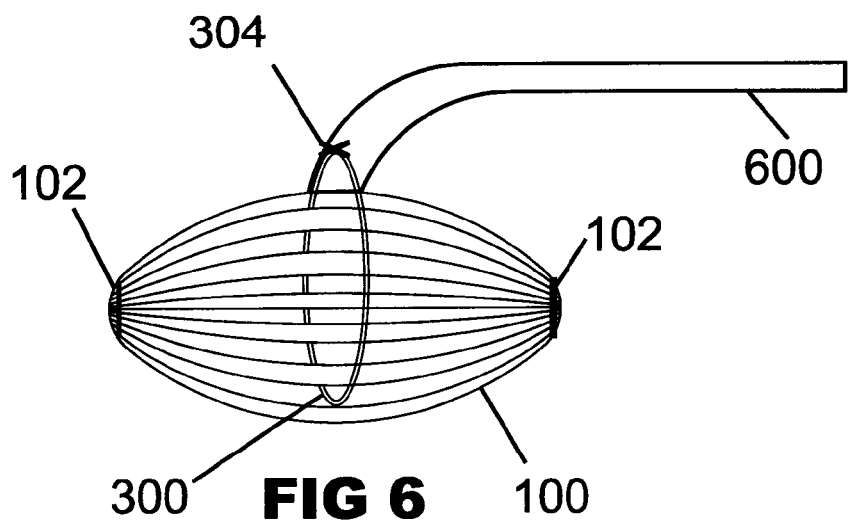
FIG. 6 shows the bath pouf with added handle.
Figure 6A:
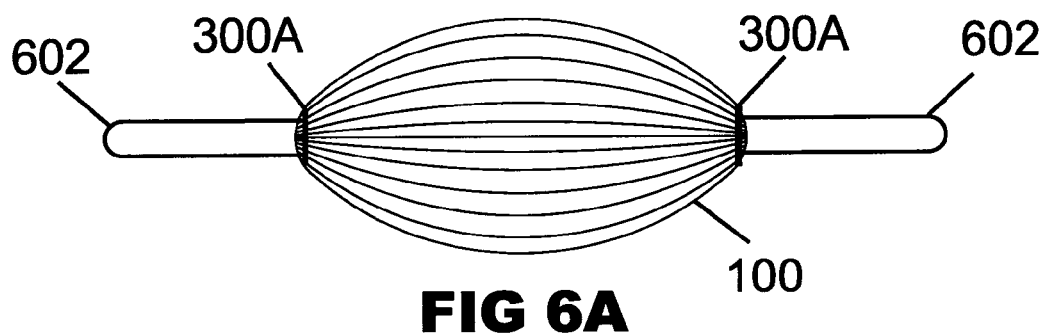
FIG. 6a shows the bath pouf with added straps.
Figure 6B:
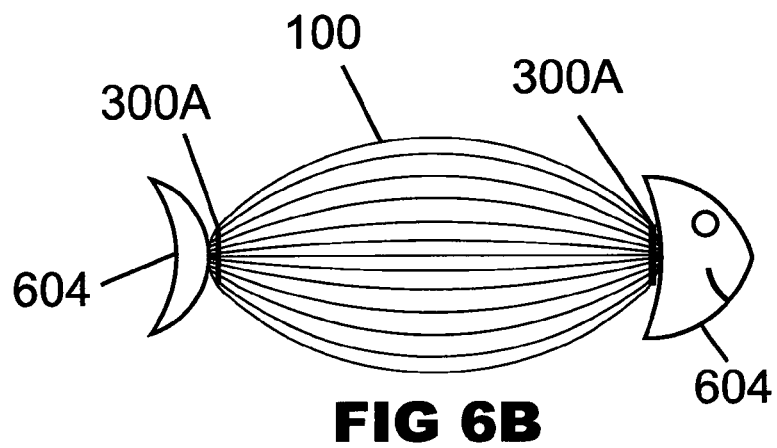
FIG. 6b shows the bath pouf with added decorative devices.

In FIG. 6 a simple elongated handle 600 of wood or plastic about 40 cm long is attached to the pouf by cord 300. In FIG. 6A two straps 602 about 30 cm long each of flexible plastic of fabric are attached to the respective ends of the pouf by line 300A. In FIG. 6B a decorative device 604 comprising a fish head and tail is provided. These parts are attached to the respective ends of the pouf by line 300A. These auxiliary devices provide users different functionality and enjoyment. Handle 600 or straps 602 enable users to wash hard to reach areas such as the back. Decorative device 604 can provided additional themed enjoyment for children.

CONCLUSIONS, RAMIFICATIONS & SCOPE

Thus the reader will see that at least one embodiment of our bath sponge or pouf produces copious aerated rich lather with a soft desirable feel while reducing environmental and economic impact, inhibiting mold growth, and making bar soap easier to use. It also provides a renewable and sustainable solution that enables complete use of many soap bars and continuous creation of aerated lather while bathing or cleaning. These benefits offer consumers a better choice to live green while getting clean. This is important as we evolve from a disposable society to a sustainable world.

While the above description contains many specifics, these should not be construed as limitations on the scope, but as illustrations of some present embodiments. Many other variations are possible. For example, the plastic mesh sleeve can be made from different materials such as natural fibers (loofa fibers) or foam. It can have smaller or larger mesh holes and or a different geometric pattern. Also it can be tied or secured by a device, a staple, glue, heat bonding, or sewing. The cord adjuster can be made from other materials and or components, such as plastic or metal parts. The soap securing apparatus can be removed or replaced by a wrap or a bag soap securing apparatus made from net or mesh materials having larger openings. The packaging card can be replaced by another material or form to communicate function and use of the pouf. In lieu of two posts 200 to hold the endless band or loop of mesh, a rectangular, circular or oval mandrel can be used. The pouf can also be constructed without the use of any device to hold the mesh but simply by bunching the material and securing it while held in a users hand. The decorative devices 604 can have many different themes.

Thus the scope of the embodiments should be determined by the appended claims and their legal equivalents, rather then by the examples given.

We claim:

1. A bathing or cleaning device comprising
    a sheet of mesh material bunched together and compressed and retained at each of two opposing ends to form a shaped structure having an outer circumference,
    the shaped structure having a plurality of adjacent portions of the mesh material and between each adjacent portion is a laterally defined opening and entry point into one of a plurality of recesses formed about the circumference, each of the plurality of recesses having an interior closed by adjacent portions of the mesh material and the opposing ends of the shaped structure so that the interior of each of the plurality of recesses defines a separate structure and does not open into an opposite side of the device and so that a bar of soap can be inserted into one of the plurality of recesses and be enfolded by at least two layers of the mesh material.

2. The bathing or cleaning device of claim 1 further including a cord threaded through selected portions of the mesh material and around the soap to retain the soap within the shaped structure and through a cord cinching device to thereby secure the soap within the shaped structure.

3. The bathing or cleaning device of claim 2 wherein said cinching device is made of an elastic O-ring.

4. The bathing or cleaning device of claim 3 wherein said cord is looped through said O-ring a plurality of times.

5. The bathing or cleaning device of claim 1, further including a net material formed into a wrap or a bag and inserted into one of the plurality of laterally opening entry points of said mesh material for providing a bar soap securing apparatus.

6. The bathing or cleaning device of claim 5, further including a cord threaded into said wrap, said bag, or said mesh material.

7. The bathing or cleaning device of claim 1, further including an auxiliary device attached to said mesh material selected from the group consisting of a handle, a strap, and an attached decorative device.

8. The bathing or cleaning device of claim 1, further including a packaging card inserted into one of the plurality of laterally opening entry points to communicate a name or a function of said device.

9. The bathing or cleaning device of claim 1 further including a separately formed soap retainer structure inserted within one of the plurality of laterally opening entry points.

10. The bathing or cleaning device of claim 9 where in the retainer structure comprises a wrap structure.

11. The bathing or cleaning device of claim 9 where in the retainer structure comprises a bag structure.

12. The bathing or cleaning device of claim 1 further including an additional retainer positioned at a middle portion of one side of the shaped structure.

* * * * *